March 7, 1939.   E. LAMPEL   2,149,848
SCREW AND NUT DEVICE
Filed Feb. 18, 1937
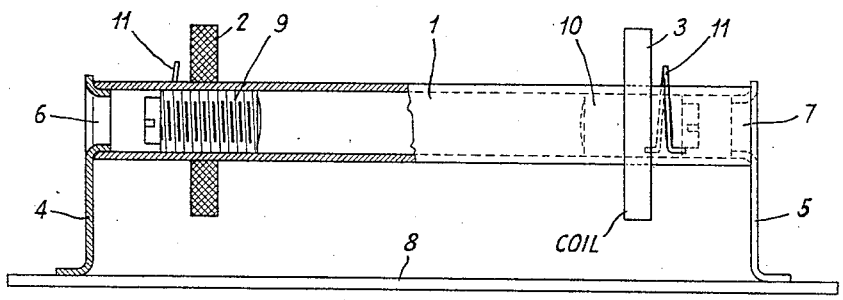
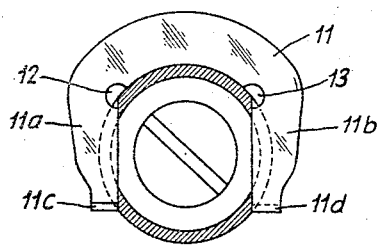
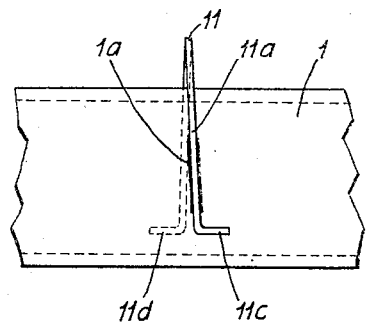
INVENTOR
ERICH LAMPEL
BY
ATTORNEY Patented Mar. 7, 1939

2,149,848

UNITED STATES PATENT OFFICE 2,149,848

SCREW AND NUT DEVICE

Erich Lampel, Niedersedlitz, Sachsen, Germany, assignor, by mesne assignments, to Radio Corporation of America, New York, N. Y., a corporation of Delaware Application February 18, 1937, Serial No. 126,360
In Germany February 19, 1936

3 Claims. (Cl. 74—424.8)

The novelty relates to coil aggregates with one or more windings and with bodies adjustably co-ordinated therewith for the purpose of setting or varying their inductance. It is known to construct these adjustable bodies as screws and to use as a nut piece therefor a spring wire, which is inserted laterally into the tubular carrier of the coils and which by its special position forms that part of a nut thread fillet which goes into the thread of the screw body. In such an arrangement, in order to avoid unnecessary diminution of the cross-section of the insulating tube, the thread fillet must be made of a springy wire having only a small diameter. Consequently the risk is incurred that with the set undergoing any shocks the screw will automatically adjust itself, i. e., the wire loop will jump axially from one thread fillet of the screw direct into an adjacent one, as a result of which the whole arrangement is detuned. Further, in the known arrangement the loop of wire has two points of rotation situated on the same side, round which its shank ends can swivel. It is therefore possible for the screw, even when no jerky transition of the loop of wire from one fillet of the screw into an adjacent one takes place, to be adjusted—including the net body—in the tube. In order to avoid these drawbacks, according to the novelty, for the formation of the nut body, a U-shaped piece of sheeet material is inserted with its shanks into two opposite slits of the insulating tube, which are offset axially in accordance with the pitch of the thread. The shanks of the U then enter at the two slits, i. e., at opposite and guided points with their position axially displaced to correspond with 2 parts in the pitch of the thread, into the interior of the insulating tube and into the thread. The sheet material cross-section of the U is so chosen that its moment of resistance is greatest at right angles to the thread axis. In order that the cooperation of nut body and screw may be free from play as possible, the U shaped piece can of course be so designed that the shanks of the U can yield flexibly by a certain amount at right angles to the thread axis. The U-shaped piece can, according to existing conditions and the conditions to be mastered, consist of metal or insulating material.

By way of example, the figures of the drawing show one construction employing the novelty. I is the insulating tube, which bears the two windings 2 and 3. The coil aggregate is arranged, by means of two angular carriers 4 and 5 which go into the ends of the insulating tube I by means of girders 6 and 7 acting mandrel-fashion, on the chassis 8 of the set. 9 and 10 are the high-frequency iron core screws co-ordinated with the windings 2 and 3 respectively for varying their inductance. In Figs. 2 and 3 a design and also arrangement (given by way of example) of the nut body for the screws 9 and 10 respectively can be seen. This consists of a U-shaped piece 11, which is inserted with its shanks 11a and 11b into two opposite notches 1a of the tube 1 and projects through these gaps on opposite points into the interior of the insulating tube 1 and at the same time engages with the thread of the screw 9. In order that the shanks of the piece 11 may be able to yield somewhat, gaps 12 and 13 are provided on its juncture point on the yoke of the U. In order to secure automatically the nut body inserted into the insulating tube, the ends 11c and 11d of its shanks are bent round, so that they apply themselves against the external mantle of the insulating tube. If the nut body consists of insulating material, it can of course also be connected with the body of the insulating tube by an agglutinent or cement. Instead of that, however, it is possible in all cases to employ a special supplementary device which holds the nut body in position and for this purpose secures the U-shaped piece against displacement by co-operating with the ends of the shanks.

What I claim is:

1. In a device of the kind described, a sleeve member, a pair of oppositely disposed recesses formed on the sleeve member, said recesses being axially displaced to correspond with a predetermined thread pitch, a U-shaped saddle member inserted with its shanks laterally into the opposite recesses and so that a portion of the inner edges of each of the shanks enters the interior of the sleeve member through the recesses to form a partial screw thread within the sleeve member, a core provided with an external screw thread having substantially said same predetermined thread pitch and of such diameter that the core member can enter said sleeve member, said screw thread on the core member cooperating with the partial screw thread formed by said shanks within the sleeve member so that the core may be adjusted within the sleeve member by turning the same.

2. In a device of the kind described, an insulating sleeve, a core comprising a screw member, means for adjustably mounting said core within said sleeve, said mounting means including a U-shaped saddle adapted to be placed over the sleeve member, said saddle having its shanks laterally within opposite milled recesses formed on said sleeve and axially displaced thereon to correspond with the thread pitch of the screw member, said saddle cooperating with the screw member to form the support for the core.

3. An arrangement as described in the next preceding claim characterized by that the saddle member is composed of resilient material and by that the ends of the shanks are provided with out-turned portions, said shanks being of sufficient length to extend considerably beyond the axis of the sleeve member, said out-turned portions cooperating with the sleeve member to maintain the saddle member in place.

ERICH LAMPEL.